US008955426B2

(12) United States Patent
Glynn

(10) Patent No.: US 8,955,426 B2
(45) Date of Patent: Feb. 17, 2015

(54) EFFICIENT REVERSIBLE GRILL

(75) Inventor: Kenneth P. Glynn, Flemington, NJ (US)

(73) Assignee: Glynntech, Inc., Flemington, NJ (US)

( * ) Notice: Subject to any disclaimer, the term of this patent is extended or adjusted under 35 U.S.C. 154(b) by 2007 days.

(21) Appl. No.: 12/151,649

(22) Filed: May 8, 2008

(65) Prior Publication Data
US 2008/0216672 A1 Sep. 11, 2008

Related U.S. Application Data

(63) Continuation-in-part of application No. 29/288,357, filed on Jun. 8, 2007, now Pat. No. Des. 568,683, and a continuation-in-part of application No. 11/474,618, filed on Jun. 26, 2006.

(51) Int. Cl.
A47J 37/07 (2006.01)
A47J 37/10 (2006.01)
A47J 27/04 (2006.01)
A47J 37/06 (2006.01)

(52) U.S. Cl.
CPC ............... A47J 27/04 (2013.01); A47J 37/067 (2013.01); A47J 37/10 (2013.01)
USPC ............................................. 99/450; 99/422

(58) Field of Classification Search
USPC .................. 99/446, 450, 339, 340, 422
See application file for complete search history.

(56) References Cited

U.S. PATENT DOCUMENTS

| 936,965 | A | * | 10/1909 | Wells | 99/440 |
| 1,234,407 | A | | 7/1917 | Stiga | |
| 2,236,992 | A | | 4/1941 | Broadley | |
| 4,662,273 | A | | 5/1987 | Marchioni | |
| 5,176,067 | A | | 1/1993 | Higgins | |
| 5,367,951 | A | * | 11/1994 | Purvis | 99/450 |
| 5,400,704 | A | * | 3/1995 | Huston | 99/450 |
| 6,431,059 | B1 | * | 8/2002 | Castellani | 99/440 |
| 7,249,686 | B1 | * | 7/2007 | Aesquivel | 220/556 |
| 2002/0152900 | A1 | * | 10/2002 | Lane | 99/441 |
| 2006/0011072 | A1 | * | 1/2006 | Giornali et al. | 99/422 |

FOREIGN PATENT DOCUMENTS

EP 498048 A1 * 8/1992 ............ A47J 37/06

* cited by examiner

Primary Examiner — Henry Yuen
Assistant Examiner — Hemant Mathew

(57) ABSTRACT

An efficient reversible grilling device is used for grilling, broiling, frying, baking, boiling and steaming. It is a single element made of rigid heat conductive material with one side being flat and the other side having a plurality of nesting recesses for spherical and ovate food products. The maximum height of the reversible cooking device is 5/8 inch. Each of the plurality of nesting recesses has a depth greater than 50% of the height of the grilling device. A plurality of orifices cut through the element in the areas of the nesting recesses and in the areas away from the nesting recesses. Either surface can be used to prepare foods while providing fat and grease drainage.

18 Claims, 7 Drawing Sheets

EFFICIENT REVERSIBLE GRILL

REFERENCES TO RELATED APPLICATIONS

This is a continuation-in-part of U.S. patent application Ser. No. 29/288,357 filed on Jun. 8, 2007 now U.S. Pat. No. d,568,683, entitled "Cooking Device" by the same inventor herein and U.S. patent application Ser. No. 11/474,618 filed on Jun. 26, 2006, entitled "Reversible Grill" by the same inventor herein.

BACKGROUND OF THE INVENTION

1. Field of the Invention

The present invention relates to an improved cooking device for use in frying pans, sauce pans, ovens and countertops that has many functions. It is a reversible grill with a plurality of orifices or slots to permit food fats, such as grease, to drip down into or through the device. The present invention cooking device has a plurality of nesting recesses formed, molded, or cut into one side and, thus, on one side becomes a cooker for meatballs and other small food masses when placed in a frying pan or on a plate grill with the nesting recesses up. When it is reversed with the nesting recesses down, it may be used in a frying pan for grilling steak, burgers, fish, chicken, etc. Separately the present invention device may be used for backing support such as for bread and pizza. It may also be used as a cake cooling device to raise a cake off a plate for underside circulation, or it could be used as a server.

2. Information Disclosure Statement

The following patents relate to the field of cookware, especially for accommodating spherical shaped foods.

U.S. Pat. No. 6,431,059 B1 is a device for backing spherical food products. It includes a main support, made of material capable of sustaining a temperature of at least 500 degrees Fahrenheit, which has an outer perimeter for nesting atop a pan or its equivalent, e.g., a cake pan, brownie pan, cookie tin, a pot, a frying pan, or even a piece of aluminum foil folded on its edges to act like a pan. The primary purpose of the pan is to receive and hold grease and drippings from the food products being cooked in the present invention devices. The main support of the present invention device includes a plurality of semispherical recesses, each having a predetermined outer radius, and being located on the main support typically in an orderly fashion, and having a plurality of drainage holes located thereon. The invention may be formed of a high temperature tolerant material such as metal, ceramic, and glass, and may also have a non-stick coating.

U.S. Pat. No. 5,176,067 is an apparatus for grilling food including a base, a reflector positioned within the base, a heating element mounted upon the base and spaced above the reflector, and a food-supporting grill. The reflector includes a downwardly sloped bottom surface having a central region shaped to define a flavor well and a plurality of perforations disposed outside of the flavor well to direct drippings away from the flavor well.

U.S. Pat. No. 4,662,273 is a device for cooking fatty foods such as meatballs or other foods which are characterized by the production of liquid fat during the cooking process is disclosed. A pan having a bottom and upstanding side walls is provided. A removable heat-conductive tray is adapted to be supported in spaced relationship above the bottom of the pan. The tray includes a plurality of food supporting cavities and the bottom of each cavity is provided with a drain for permitting liquids removed from the food during cooking to drain into the bottom of the pan. Removable electric resistance heating means is adapted to be supported beneath the tray in heat conductive relation therewith for conduction head to and throughout the tray sufficient to cook the food in the cavities, the heating means underlying the tray and positioned above the level of the drains so as to provide unrestricted passage of liquids emanating from food being cooked in the cavities for the drains to the bottom of the pan.

U.S. Pat. No. 2,236,992 in combination with a boiling pan having a bottom wall and side walls, a rack for supporting the food to be broiled above the bottom wall, a removable liner overlying the inner faces of the bottom and side walls of the broiling pan, said liner consisting of a thin bendable metallic sheet conforming to the shape of the inside of the broiling pan, and said rack having portions in contact with said liner.

U.S. Pat. No. 936,965 is an egg cooking utensil comprising a receptacle for boiling water, a cover therefor, the sides of said receptacle being inwardly bent to form an internal rib near the upper edge thereof, in combination with an egg supporting frame comprising a skeleton plate having a downwardly extending circumferential flange of slightly less diameter than said plate and forming therewith an outwardly extending rib, said skeleton plate having openings there through in which eggs may be supported, and a series of openings through which steam may pass to the receptacle above the plate, means for lifting said plate and a plurality of egg holders adapted to fit in said openings in the plate and having circumferential flanges for supporting the same, and said circumferential flange extending below the level of the bottoms of said holders to support the same out of contact with the support upon which the device is resting when removed from the receptacle, substantially as described.

U.S. Pat. No. 1,234,407 is an apparatus for backing dough into solid rolls, the combination with a pair of cooperating plate sections and means for holding them in operative position, of a plurality of spaced-apart cavities formed in the inner face of one section, each cavity being substantially circular in outline and having curved interior walls prolonged into a flat bottom, and a corresponding plurality of spaced apart cavities formed in the confronting face of the other section, each cavity having acutely edged semi-partitions converging into a prolonged outstanding point at the center of the bottom of the cavity to give the top of the roll centrally converging divisional lines.

Notwithstanding the foregoing prior art patents, the present invention is neither taught nor rendered obvious in view of said prior art references.

SUMMARY OF THE PRESENT INVENTION

The present invention relates to a efficient reversible grilling device for grilling, broiling, frying, baking, and steaming. The present invention grilling device consists of a single component element of rigid heat conductive material having a top, a bottom and at least one side wall. The side wall has a maximum height of ⅝ inch. The top and bottom both have flat surfaces. The single component element has a plurality of orifices passing from the top to the bottom. The top flat surface has a plurality of nesting recesses, each of the plurality of nesting recesses having a depth greater than 50% of the height of the side wall, wherein the device may be placed adjacent a heating means for cooking with the top surface up to cook a plurality of food units in the plurality of recesses, and the device may be placed adjacent the heating means for cooking with the bottom surface up to cook at least one food unit on the flat surface.

In some preferred embodiments of the present invention grilling device, the single component element has a top view peripheral shape selected from the group consisting of circle, ellipse, square, rectangle, and a polygon having at least five sides. In some preferred embodiments of the present invention grilling device a portion of the peripheral shape is truncated. In some preferred embodiments of the present invention grilling device the orifices are a plurality of elongated parallel slots.

In some preferred embodiments of the present invention grilling device the plurality of recesses are a plurality of curved recesses. In some preferred embodiments of the present invention grilling device the plurality of recesses are a plurality of spherical section recesses. In some preferred embodiments of the present invention grilling device the device includes at least one hanging orifice.

In some preferred embodiments of the present invention grilling device the single component element is made of a rigid heat conductive material selected from the group consisting of iron alloys, aluminum, stainless steel, ceramic and heat sustaining glass.

In some preferred embodiments of the present invention grilling device the single component element has a non-stick coating on its surfaces.

In addition to the device itself, in some embodiments, the present invention is an efficient reversible grilling device cooking system, which comprises an efficient reversible grilling device that consists of a single component element of rigid heat conductive material having a top and a bottom and at least one side wall with the same features as described above. The side wall has a maximum height of ⅝ inch. It also includes a support member for supporting the efficient reversible grilling device has a base and legs extending downwardly from the base. In some preferred embodiments of the present invention grilling device, the support member includes attachment means for attaching the efficient reversible grilling device thereto. In some preferred embodiments of the present invention grilling device, the legs are foldable legs.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
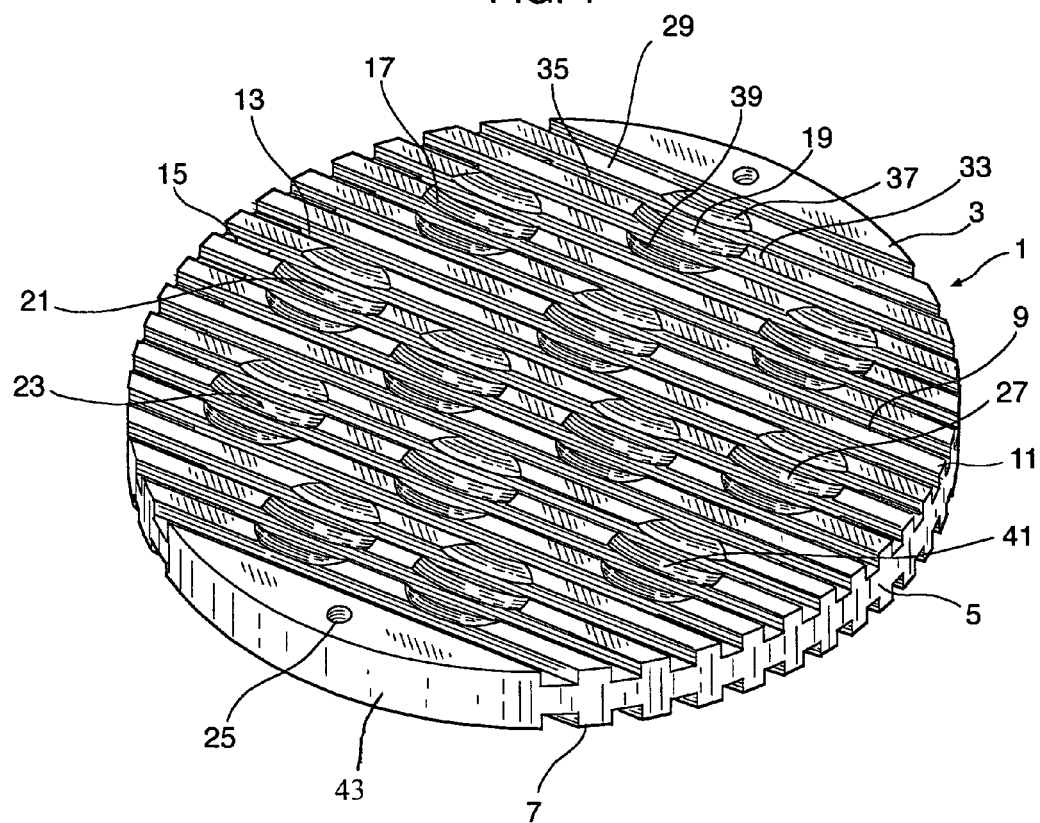
FIG. 1 illustrates a top oblique view of one preferred embodiment of the present invention efficient reversible grilling device.
Figure 2:
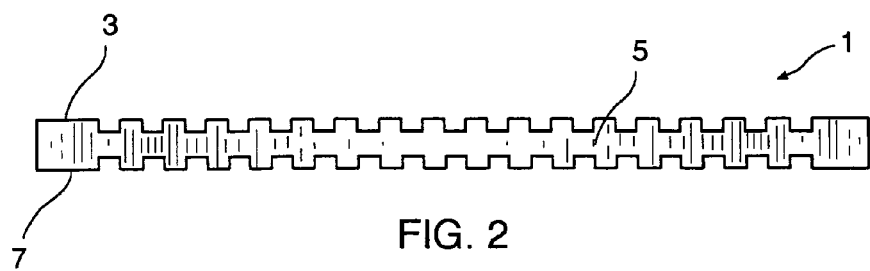
FIG. 2 illustrates a front view of the preferred embodiment of the present invention shown in FIG. 1.
Figure 3:
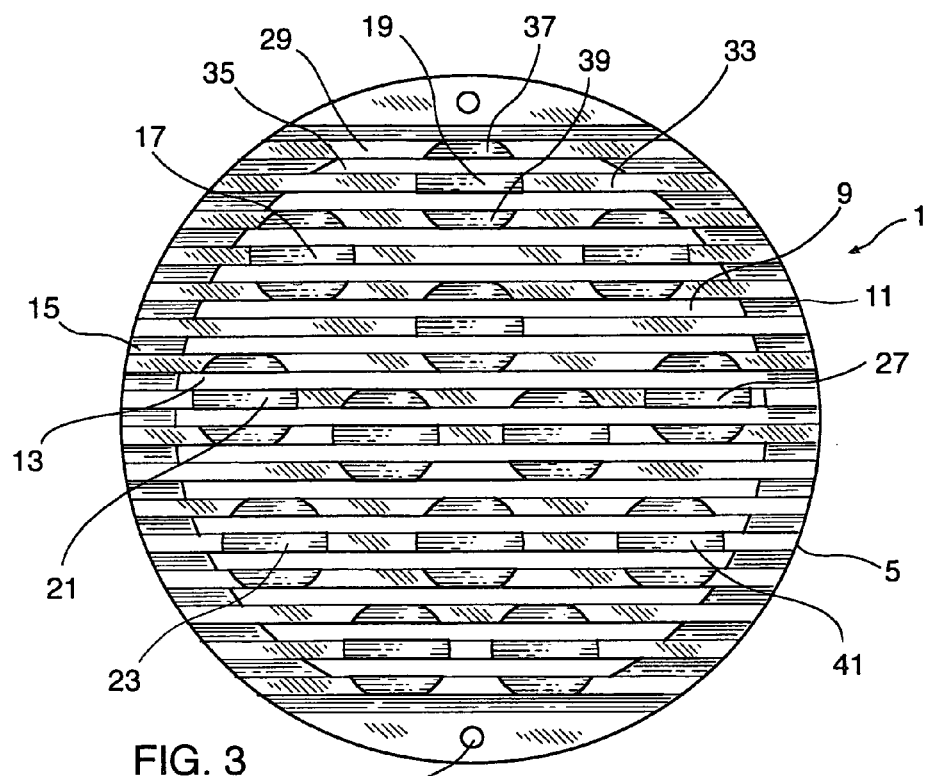
FIG. 3 illustrates a top view thereof.

The present invention efficient reversible grill functions in many different ways to achieve many different excellent cooking results, while doing so very economically. It functions as a grill and can create searing effects on meat, fish, and poultry, as well as sea food, vegetables, burger, etc. Not only is a true open grill flavor imported, but unlike frying pan cooked foods, the greases and fats are significantly separated so as to provide leaner foods to the consumer. Furthermore, the present invention side wall has a maximum height of ⅝ inch, which is much more efficient than greater heights because the start-up time for grilling is much faster with this maximum height. Moreover, each of nesting recesses cut into the top of the grill have a depth greater than 50% of the height of the side wall. This depth dimension of the recesses also facilitates more efficient grilling by providing the ability for meatballs and other foods located in the recesses to have enhanced cooking because the foods placed in the recesses are considerably closer to a frying pan, a stove, and an outdoor grill, or any other cooking element upon which the efficient reversible grill is placed with the nesting axis up.

The present invention efficient reversible grilling device 1 shown in FIGS. 1 through 4 illustrate one preferred embodiment. All of the figures that include or show present invention device 1 are described collectively and identical elements are identically numbered.

Present invention efficient reversible grilling device 1 is generally circular from a top view and has a top surface 3, a side wall 5, and a bottom 7. The side wall 5 has a maximum height 43 of ⅝ inch. Top 3 has a plurality of orifices that, in this embodiment are rectangular slots such as slots 9, 13, 35, 55, and 57, that are fully cut through except around the peripheral edges when grooves are established, such as grooves 11 and 15. These slots create parallel support bar sections such as bar sections 29 and 33. Top 3 also has a plurality of nesting recesses cut therein for receiving meatballs and other similar piece meal foods. Thus, nesting recesses such as recesses 17, 19, 21, and 41. Each of the nesting recesses 17, 19, 21 and 41 have a depth greater than 50% of the height 43 of the side wall 5. The plurality of draining orifices "in this embodiment" slots includes areas separate from the nesting recesses. For example nesting recess 19 has three separate segments, including outer segments 37 and 39.

Figure 4:
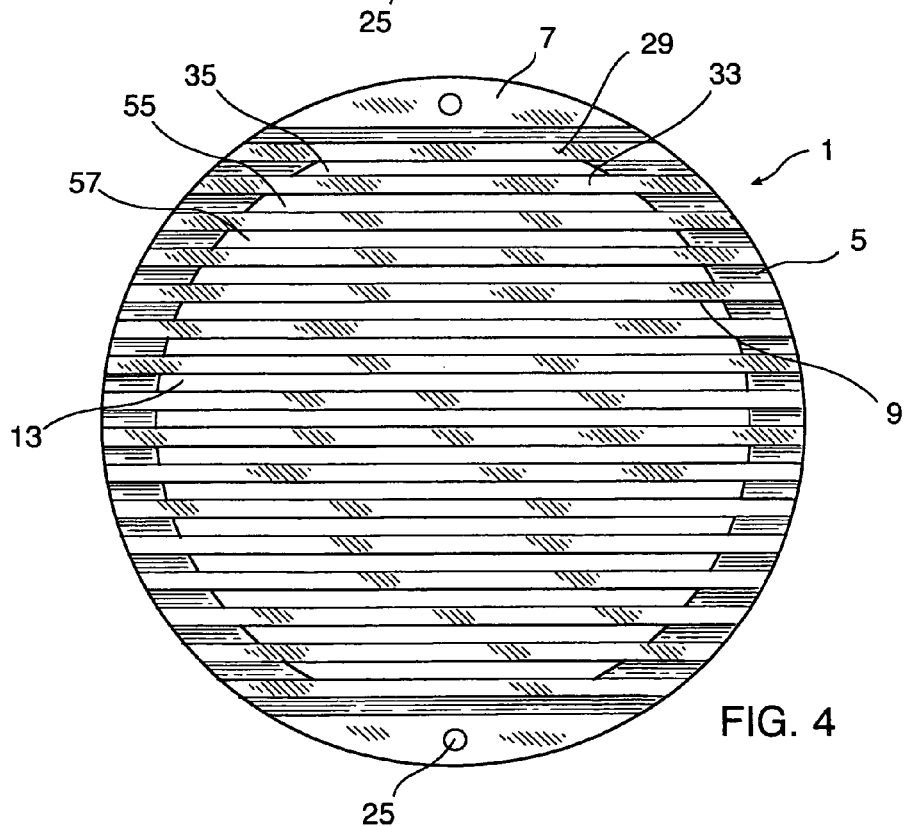
FIG. 4 illustrates a bottom view thereof.

It is essential to the present invention that the drainage orifices be located both within the nesting recesses and in areas separate from nesting recesses. Thus, when device 1 is placed in a frying pan or other cookware with top 3 up as shown in FIG. 1 and when meatballs or shrimpballs or fishballs or other similar piece meal foods are cooked in the recesses, the draining orifices or orifice segments in the recesses will drain fats, oils and other liquids. When device 1 is reversed and bottom 7 is up, as shown in FIG. 4, the drainage orifices areas both with the nesting recesses and outside the areas of the nesting recesses act as large drainage areas that efficiently remove fat and grease from steak, hamburgers, split hotdogs, poultry, etc. Further, when device 1 is used for steaming as will be described bellow, the large areas created by the drainage orifices allow significant steam to rise up from boiling water in an efficient and very well distributed manner.

Present invention efficient reversible grilling device 1 is a non-flexible device that will become a permanent part of one's kitchen cookware and is intended to last many years because of its simple cost to manufacture and its divers usage, it is anticipated that many cooks will want a number of such devices in diverse sizes and shapes. Device 1 is provided with two circular orifices such as orifice 25 for hanging on a nail or hook. These orifices may also be used as reserving holes for mating the efficient reversible grilling device of the present invention with support members for steaming.

Figure 5:
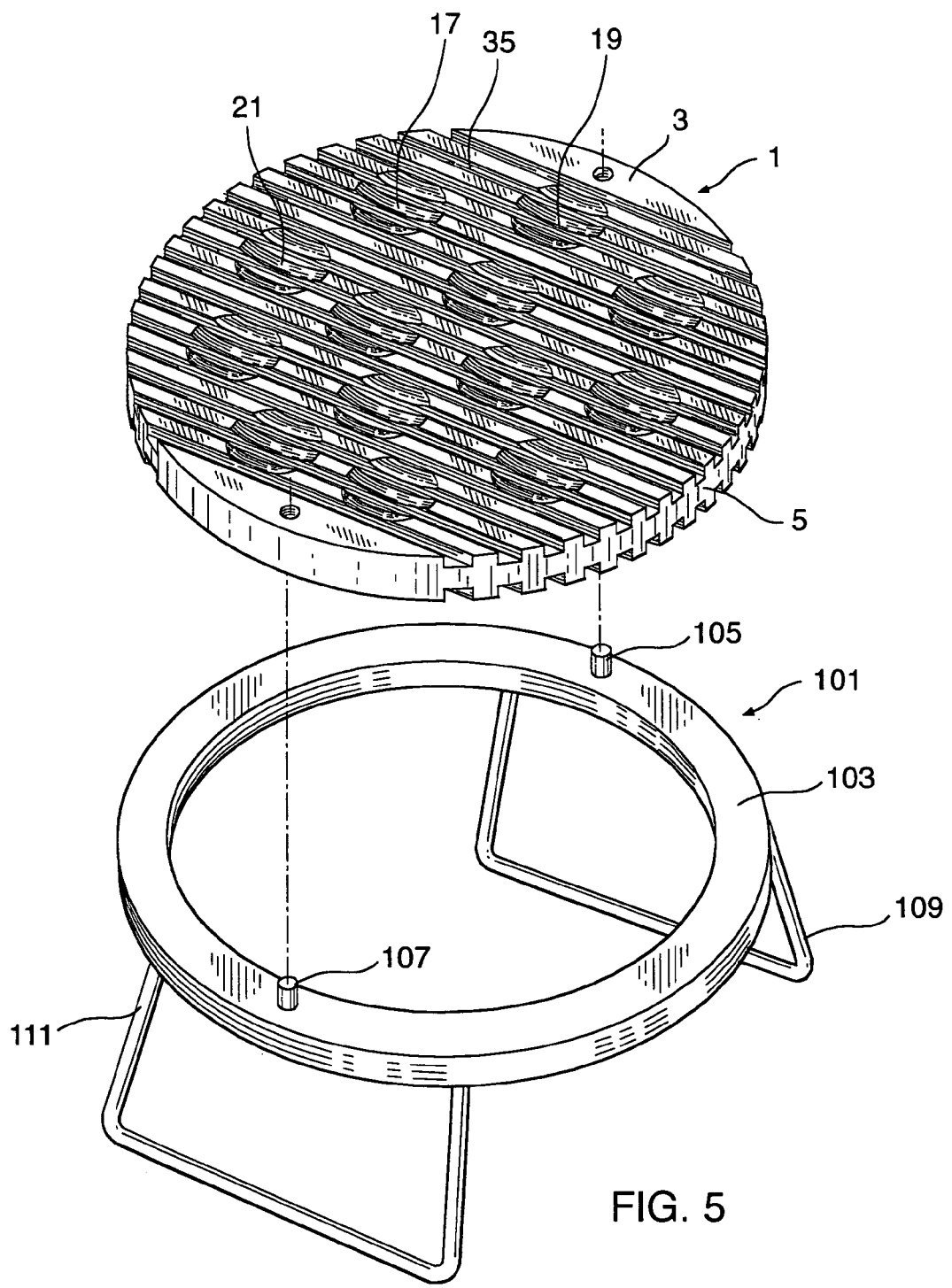
FIG. 5 shows a top perspective view of the present invention reverse grilling device illustrated above along with a support member for placement in a saucepan or similar cookery.
Figure 6:
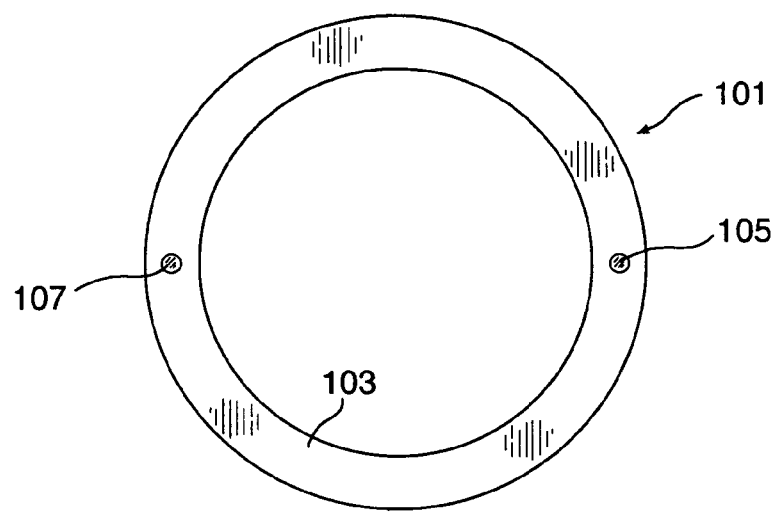
FIGS. 6, 7, 8, 9 respectively illustrate top, front closed, front open and side open views of the present invention support member shown in FIG. 5 above.
Figure 7:
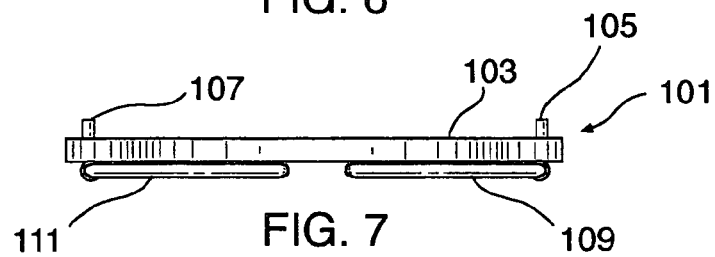
Figure 8:
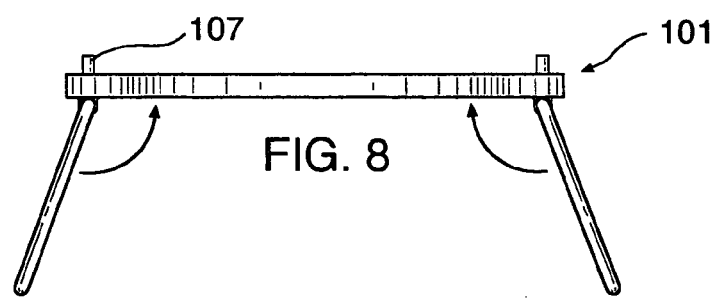
Figure 9:
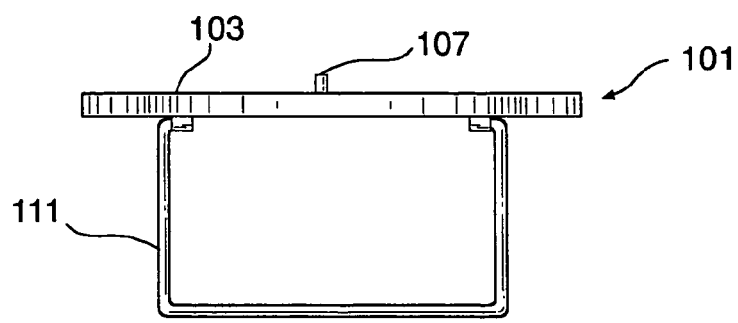

FIG. 5 shows efficient reversible grilling device invention being aligned with support member 101 for placement in a saucepan, lobster pan, or similar cookery for steaming. Support member 101 has a base 103, in this case, a ring. Base 103 is two opposing protrusions 105 and 107 for alignment with the corresponding holes in reversible grill device 1, as indicated by the doted lines in FIG. 5. Legs 109 and 111 extend down from base 103, and may, as in this case be foldable. Place device 1 on base 101 with the nesting recesses up as shown in FIG. 5 or, with nesting recesses down. The combination of the efficient reversible grilling device and a support member may be placed in any steam created cooking environment. With nesting recesses up, steamed clams or oysters, steam boiled eggs and the like may be prepared with the recesses up or down. Vegetables, fish, dim sum, lobster, crab legs or any other food may be steam cooked or parched.

FIGS. 6 through 9 show top, front with legs closed, front with legs open and side views of the support member 101 shown in FIG. 5. Identical parts are identically numbered.

Figure 10:
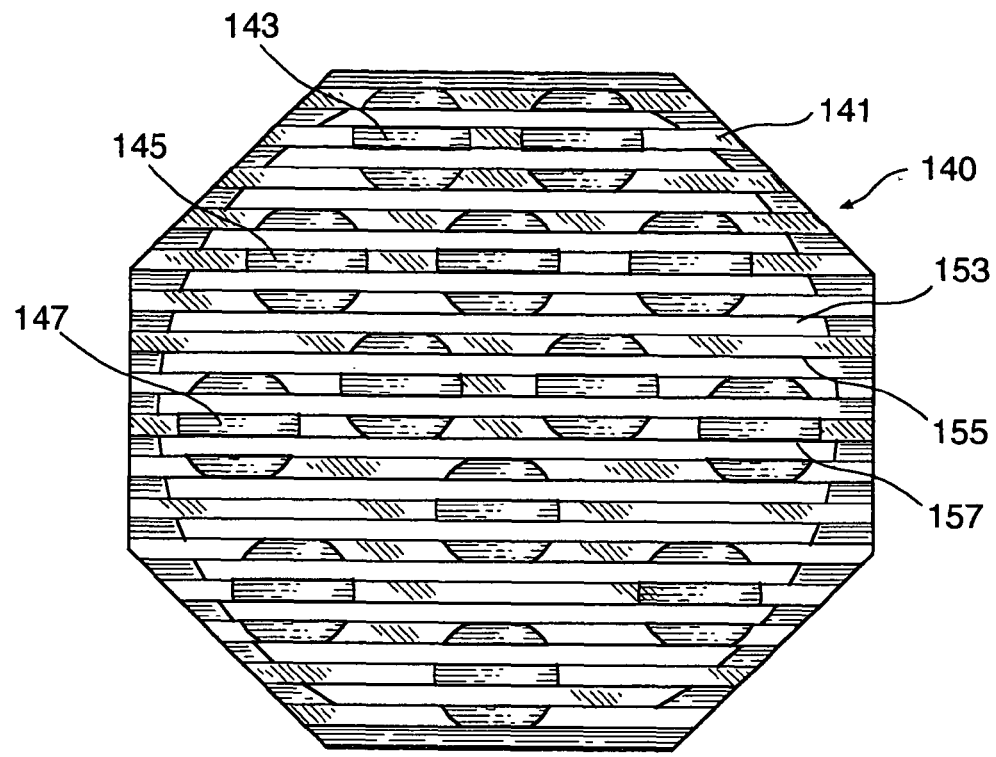
FIGS. 10, 11, 12, 13 show top views of the present invention reverse grilling device with different shapes and drainage orifices arrangements; and, FIG. 14 shows a cut-out side vies of the present invention reverse grilling device, illustrating the depth of a nesting recess in relation to the height of the grilling device.

FIG. 10 shows a top view of an rectangular present invention reversible cooking device 140. The maximum height of the reversible cooking device 140 is ⅝ inch. It has a flat top 141 with a plurality of nesting recesses, such as nesting recesses 143, 145, 147 machined or molded therein. Each of the nesting recesses 143, 145 and 147 has a depth greater than 50% of the height of the reversible cooking device 140. There are a plurality of drainage orifices shown that are parallel elongated slots such as slots 153, 155, and 157. Device 140 functions in essentially the same manner as device 1 described above.

Figure 11:
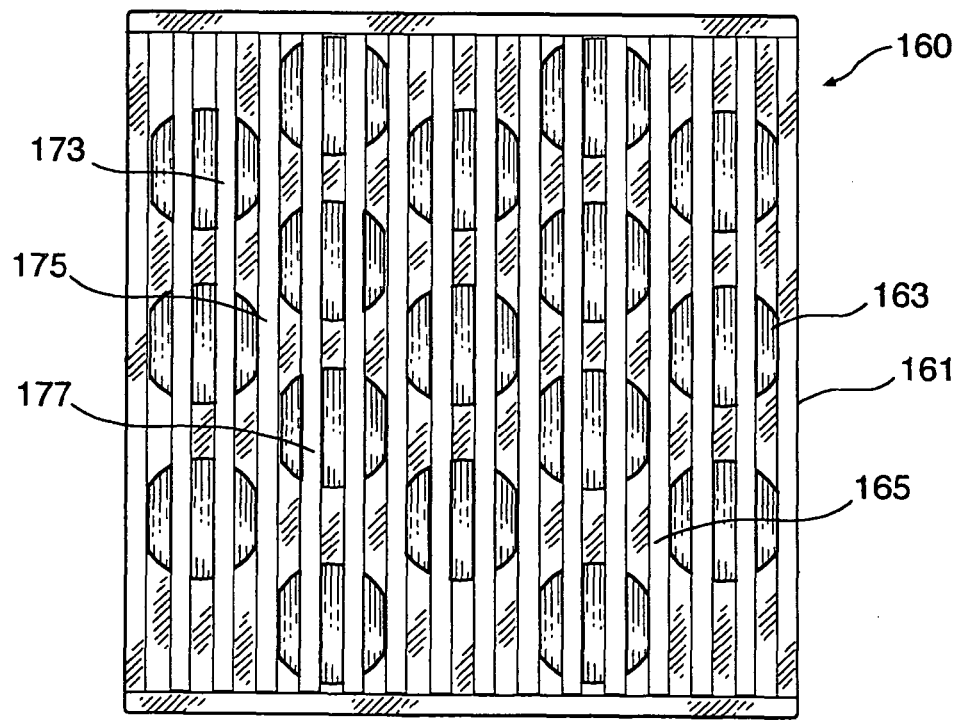

FIG. 11 shows a top view of an rectangular present invention reversible cooking device 160. The maximum height of the reversible cooking device 160 is ⅝ inch. It has a flat top 161 with a plurality of nesting recesses, such as nesting recesses 163 and 165 machined or molded therein. Each of the nesting recesses 163 and 165 has a depth greater than 50% of the height of the reversible cooking device 160. There are a plurality of drainage orifices shown that are parallel elongated slots such as slots 173, 175, and 177. Device 160 functions in essentially the same manner as device 1 described above.

Figure 12:
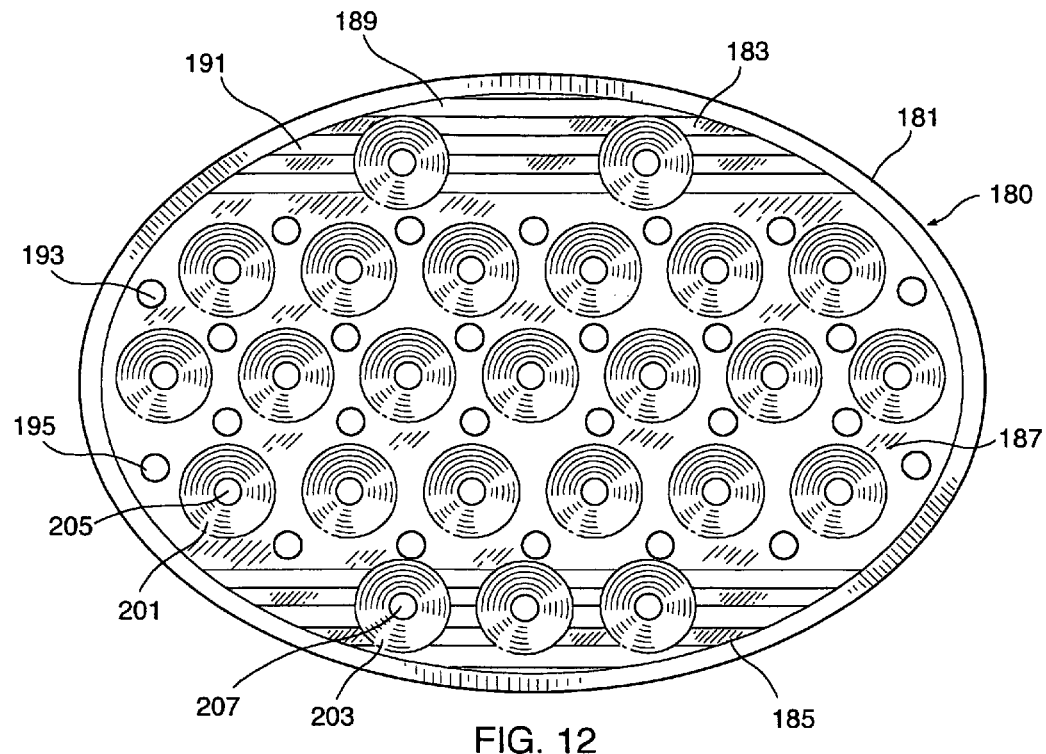

FIG. 12 shows present invention oval type efficient reversible grilling device 180. The maximum height of the reversible cooking device 180 is ⅝ inch. It has a solid peripheral boarder 181, some bar 183 and 185 with open slots such as slots 189 and 191. A larger center plate area 187 has circular drainage holes instead of slots such as drainage holes 193 and 195. The device 180 also includes many nesting recesses such as 201 and 203. Each of the nesting recesses 201 and 203 has a depth greater than 50% of the height of the reversible cooking device 180. These have drainage holes such as orifices such as 205 and 207. Device 180 may be used in a fashion similar to the usage fore the present invention devices previously described.

Figure 13:
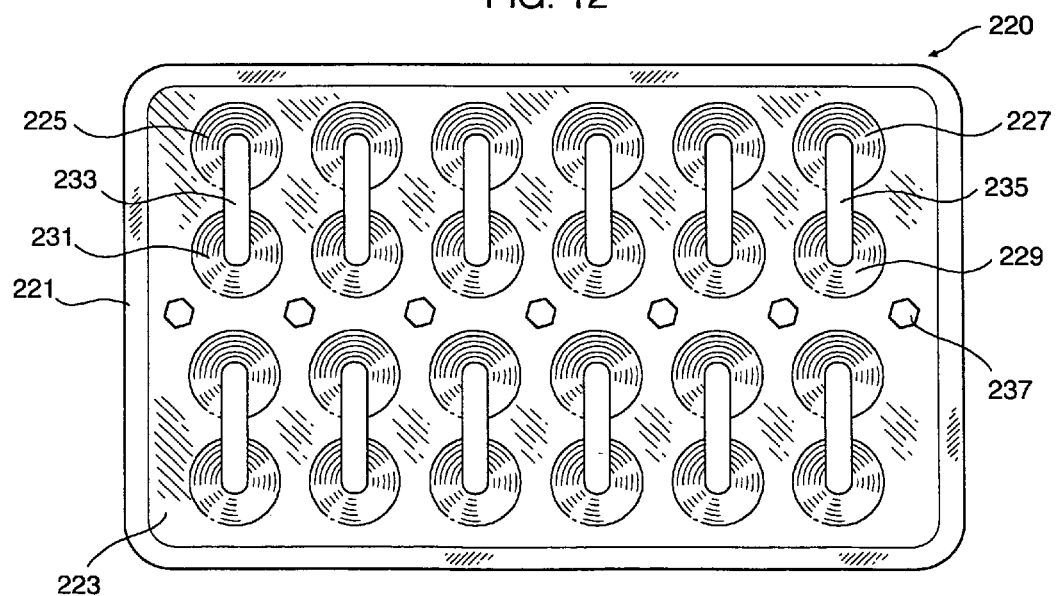

FIG. 13 shows a rectangular present invention efficient reversible grilling device 220. The maximum height of the reversible cooking device 220 is ⅝ inch. It has twenty-four circularly arranged nesting recesses, such as nesting recesses 225, 227, 229 and 231. Each of the nesting recesses 225, 227, 229 and 231 has a depth greater than 50% of the height of the reversible cooking device 220. Device 220 has a top 223 with a peripheral cut frame 221 that is thinner then the main body of the device drainage orifices that forms in this embodiment. There are linear slots such as slots 237 and 235 for drainage that cut through pairs of nesting recesses as well as the main body between the pairs of nesting recesses. Additional hexagonal drainage orifices, such as orifice 237, are also included. Device 220 may be utilized on an open grill such as a flat grill in a restaurant in a fashion similar to that described above. When nested on a comparable cookie sheet with its flat side up, it may be used as an oven broiler. With the nesting axis up it may be used as a meatball cooker on a stove, outdoor grill or for baking meatballs in an oven. Further, it may be used in any other manor set forth in the above discussion of the previous figure.

Figure 14:
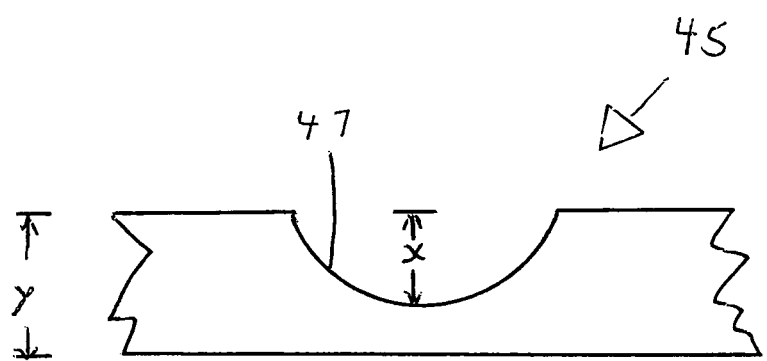

FIG. 14 shows a cut-out side vies of the present invention efficient reversible grilling device 45, illustrating the depth x of a nesting recess 47 in relation to the height y of the grilling device 45. The depth x of the nesting recess 47 at its maximum depth is greater than 50% of the height y of the grilling device 45.

Numerous modifications and variations of the present invention are possible in light of the above teachings. For example, rounded edges may be used to decrease abrasion of the present invention device edges. It is therefore understood that within the scope of the appended claims, the invention may be practiced otherwise than as specifically described herein.

What is claimed is:

1. An efficient reversible grilling device for grilling, broiling, frying, baking, and steaming, which consists of:
   a single component element of rigid heat conductive material having a top and a bottom and at least one side wall, said side wall having a maximum height of ⅝ inch, said top having a flat surface and said bottom having a flat surface, said single component element having a plurality of drainage orifices passing from said top to said bottom, and said top flat surface having a plurality of nesting recesses, each of said plurality of nesting recesses having a depth greater than 50% of said height of said side wall, wherein said drainage orifices cut through said recesses such that said drainage orifices are located both within said nesting recesses and in areas separate from said nesting recesses, wherein said device is placed adjacent a heating means for cooking with said top surface up to cook a plurality of food units in said plurality of recesses, and wherein said device is placed adjacent said heating means for cooking with said bottom surface up to cook at least one food unit on said flat surface.

2. The efficient reversible grilling device of claim 1 wherein said single component element has a top view peripheral shape selected from the group consisting of circle, ellipse, square, rectangle, and a polygon having at least five sides.

3. The efficient reversible grilling device of claim 1 wherein said plurality of drainage orifices is a plurality of elongated parallel slots.

4. The efficient reversible grilling device of claim 1 wherein said plurality of nesting recesses is a plurality of curved recesses.

5. The efficient reversible grilling device of claim 1 wherein said plurality of nesting recesses is a plurality of spherical section recesses.

6. The efficient reversible grilling device of claim 1 wherein said single component element is made of a rigid heat conductive material selected from the group consisting of iron alloys, aluminum, stainless steel, ceramic, and heat sustaining glass.

7. The efficient reversible grilling device of claim 1 wherein said single component element has a non-stick coating on its surfaces.

8. The efficient reversible grilling device of claim 1 wherein said device includes at least one hanging orifice passing from said top to said bottom.

9. An efficient reversible grilling device cooking system, which comprises:

A.) an efficient reversible grilling device consisting of a single component element of rigid heat conductive material having a top and a bottom and at least one side wall, said side wall having a maximum height of ⅝ inch, said top having a flat surface and said bottom having a flat surface, said single component element having a plurality of nesting recesses, each of said plurality of nesting recesses having a depth greater than 50% of said height of said side wall, wherein said drainage orifices cut through said recesses such that said drainage orifices be located both within said nesting recesses and in areas separate from said nesting recesses, wherein said device is placed adjacent a heating means for cooking with said top surface up to cook a plurality of food units in said plurality of recesses, and wherein said device is placed adjacent said heating means for cooking with said bottom surface up to cook at least one food unit on said flat surface; and B.) a support member for supporting said efficient reversible grilling device, said support member having a base and legs extending downwardly from said base.

10. The efficient reversible grilling device cooking system of claim 9 wherein said single component element has a top view peripheral shape selected from the group consisting of circle, ellipse, square, rectangle, and a polygon having at least five sides.

11. The efficient reversible grilling device cooking system of claim 9 wherein said plurality of drainage orifices is a plurality of elongated parallel slots.

12. The efficient reversible grilling device cooking system of claim 9 wherein said plurality of nesting recesses is a plurality of curved recesses.

13. The efficient reversible grilling device cooking system of claim 9 wherein said plurality of nesting recesses is a plurality of spherical section recesses.

14. The efficient reversible grilling device cooking system of claim 9 wherein said single component element is made of a rigid heat conductive material selected from the group consisting of iron alloys, aluminum, stainless steel, ceramic, and heat sustaining glass.

15. The efficient reversible grilling device cooking system of claim 9 wherein said single component element has a non-stick coating on its surfaces.

16. The efficient reversible grilling device cooking system of claim 9 wherein said device includes at least one hanging orifice passing from said top to said bottom.

17. The efficient reversible grilling device cooking system of claim 9 wherein said support member includes attachment means for attaching said efficient reversible grilling device thereto.

18. The efficient reversible grilling device cooking system of claim 9 wherein said legs are foldable legs.

* * * * *